(12) United States Patent
Carter et al.

(10) Patent No.: US 8,728,602 B2
(45) Date of Patent: May 20, 2014

(54) MULTI-COMPONENT ADHESIVE SYSTEM

(75) Inventors: David J. Carter, Maynard, MA (US); Jonathan Bernstein, Medfield, MA (US); Peter Kerrebrock, Hingham, MA (US); Arnis Mangolds, Stow, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 798 days.

(21) Appl. No.: 12/110,898

(22) Filed: Apr. 28, 2008

(65) Prior Publication Data

US 2009/0269536 A1    Oct. 29, 2009

(51) Int. Cl.
*B32B 9/04*       (2006.01)
*B32B 7/10*       (2006.01)

(52) U.S. Cl.
USPC ............ 428/40.1; 428/41.9; 428/343

(58) Field of Classification Search
USPC ................ 428/40.1, 41.9, 343
See application file for complete search history.

(56) References Cited

U.S. PATENT DOCUMENTS

| | | | |
|---|---|---|---|
| 2,451,194 A | | 10/1948 | Braun |
| 3,236,715 A | | 2/1966 | Gunderson |
| 3,476,257 A | * | 11/1969 | O'Connell .................. 211/13.1 |
| 3,857,560 A | | 12/1974 | Gundlach |
| 4,120,304 A | | 10/1978 | Moor |
| 5,162,138 A | * | 11/1992 | Caflisch et al. ............... 428/17 |
| 5,342,665 A | * | 8/1994 | Krawitz ..................... 428/41.9 |
| 5,513,456 A | | 5/1996 | Gleason |
| 5,776,289 A | | 7/1998 | Steidinger |
| 5,903,869 A | | 5/1999 | Jacobson et al. |
| 6,084,010 A | | 7/2000 | Baetzold et al. |
| 6,127,002 A | | 10/2000 | Callahan, Jr. et al. |
| 6,293,038 B1 | | 9/2001 | Chang |
| 6,431,513 B1 | | 8/2002 | Rosen |
| 6,572,945 B2 | * | 6/2003 | Bries et al. .................. 428/40.1 |
| 6,660,352 B2 | | 12/2003 | Hsu et al. |
| 6,722,026 B1 | | 4/2004 | Lent |
| 6,737,160 B1 | | 5/2004 | Full et al. |
| 6,773,780 B2 | | 8/2004 | Hutter, III |
| 6,800,168 B2 | | 10/2004 | Yamaguchi et al. |
| 6,858,110 B1 | | 2/2005 | Himmelsbach et al. |
| 6,872,439 B2 | | 3/2005 | Fearing et al. |
| 7,011,723 B2 | | 3/2006 | Full et al. |
| 7,186,878 B2 | | 3/2007 | Beaudry |
| 7,695,811 B2 | | 4/2010 | Northen et al. |

(Continued)

FOREIGN PATENT DOCUMENTS

| | | |
|---|---|---|
| EP | 0 942 054 | 9/1999 |
| FR | 2 249 148 A | 5/1975 |

(Continued)

OTHER PUBLICATIONS

Creton, C., *Pressure-Sensitive Adhesives: An Introductory Course.* MRS Bulletin, 2003. 28(6): p. 434-439.

(Continued)

*Primary Examiner* — Patricia L Nordmeyer
(74) *Attorney, Agent, or Firm* — Goodwin Procter LLP

(57) ABSTRACT

Adhesive systems may be fabricated to include first and second solid adhesion structures. The first adhesion structure may require an applied normal preload force to achieve adhesion to a surface. The second solid adhesion structure may be separate from but joined to the first adhesion structure such that both adhesion structures are jointly adherable to the surface upon application of the normal preload force.

12 Claims, 3 Drawing Sheets

(56) References Cited

U.S. PATENT DOCUMENTS

| | | | |
|---|---|---|---|
| 2002/0090480 A1* | 7/2002 | Hsu et al. | 428/40.1 |
| 2002/0120332 A1 | 8/2002 | Law et al. | |
| 2002/0185222 A1 | 12/2002 | Wigdorski et al. | |
| 2003/0070998 A1 | 4/2003 | Bulka | |
| 2003/0124312 A1 | 7/2003 | Autumn | |
| 2004/0005454 A1 | 1/2004 | Full et al. | |
| 2004/0020883 A1 | 2/2004 | Brokaw | |
| 2004/0071870 A1 | 4/2004 | Knowles et al. | |
| 2004/0076822 A1 | 4/2004 | Jagota et al. | |
| 2005/0072509 A1 | 4/2005 | Full et al. | |
| 2005/0092414 A1 | 5/2005 | Jones et al. | |
| 2005/0119640 A1 | 6/2005 | Sverduk et al. | |
| 2005/0148984 A1 | 7/2005 | Lindsay et al. | |
| 2005/0151385 A1 | 7/2005 | Autumn et al. | |
| 2005/0181629 A1 | 8/2005 | Jagota et al. | |
| 2005/0224975 A1 | 10/2005 | Basavanhally et al. | |
| 2005/0271869 A1 | 12/2005 | Jackson | |
| 2005/0271870 A1 | 12/2005 | Jackson | |
| 2005/0274454 A1 | 12/2005 | Extrand | |
| 2006/0029697 A1 | 2/2006 | Robbins et al. | |
| 2006/0261109 A1 | 11/2006 | Browne et al. | |
| 2008/0280085 A1 | 11/2008 | Livne | |

FOREIGN PATENT DOCUMENTS

| | | |
|---|---|---|
| FR | 2 393 097 A | 12/1978 |
| WO | WO-02-34855 A | 5/2002 |
| WO | WO-2008-018747 A | 2/2008 |

OTHER PUBLICATIONS

Daltorio, K.A. et al., A Robot that Climbs Walls using Micro-structured Polymer Feet.. in International Conference on Climbing and Walking Robots (CLAWAR), 2005. London, p. 131-138.

Autumn, K., *How Gecko Toes Stick*, in *American Scientist* vol. 94, 2006, p. 124-132.

Geim, A.K. et al., *Microfabricated adhesive mimicking gecko foot-hair*. Nature Materials, 2003, 2: p, 461-463.

Sitti, M. and R. Fearing, *Synthetic gecko foot-hair micro/nano-structures as dry adhesives*. Journal of Adhesion Science and Technology, 2003. 17(8): p. 1055-1073.

Northen, M.T. and K.L. Turner, *A batch fabricated biomimetic dry adhesive*. Nanotechnology, 2005. 16: p. 1159-1166.

Yurdumakan, B. et al., *Synthetic gecko foot-hairs from multiwalled carbon nanotubes*. Chemical Communications, 2005: p. 3799-3801.

Olson, K.A. et al., Characterization, modeling, and design on an electrostatic check with improved wafer temperature uniformity. Review of Scientific Instruments, 1995, 66(2): p. 1108-1114.

Peichel, D. et al., *Silicon Fabricated Submicrometer Stepper motor for Microsurgical Procedures*. Journal of Microelectromechanical Systems, 2002. 11(2): p. 154-160.

Enikov, E.T. and K.V. Lazarov, *Optically transparent gripper for microassembly*, in *Microrobotics and Microassembly III*. 2001: Proceedings of SPIE vol. 4568, pp. 40-49.

Provancher, W.R. et al., Towards Penetration-based Clawed Climbing, in International Conference on Climbing and Walking Robots (CLAWAR), 2004. Madrid, Spain, pp. 1-9.

Asbeck, A.T. et al., *Scaling hard vertical surfaces with compliant microspine arrays*. International Journal of Robotics Research, 2006. 15(12): p. 1165-1180.

Asbeck, A.T. et al., Climbing Walls with Microspines. in 2006 Conference on International Robotics and Automation. 2006. Orlando, FL: IEEE.

Kim, S. et al., Spinybot II: climbing hard walls with compliant microspines. in International Conference on Advanced Robotics. 2005. Seattle, WA: IEEE, p. 601-606.

Autumn, K., et al., *Robots in Scansorial Environments in Unmanned Ground Vehicle Technology VII*, Proceedings of SPIE, 2005. vol. 5804: p. 291-302.

International Search Report and Written Opinion for PCT/US2009/041912, mailed Jul. 16, 2009.

* cited by examiner

MULTI-COMPONENT ADHESIVE SYSTEM

TECHNICAL FIELD

The present invention relates, in various embodiments, to adhesive systems that include multiple complementary adhesion structures.

BACKGROUND

Various types of adhesives have been fabricated for different, often specialized, applications. While many adhesives are liquids, e.g., glues or epoxies, such adhesives are often not suitable for all applications, for example those in which cleanliness or only a temporary bond are important. Numerous modern adhesives are solids and form reversible bonds. However, many such adhesives are very specialized, i.e., they may resist a delamination force in shear or tension, but not both. Furthermore, many individual adhesives adhere only to specific surface types, e.g., smooth, rough, hard, soft, etc. Certain types of adhesives also require a preload force (i.e., a force applied in a direction normal to a surface) in order to bond to a surface. Moreover, many mechanical "adhesives" such as electromagnets, electrostatic clamps, and suction cups require applied power or vacuum to maintain their bond.

Thus, while most adhesives function quite well for specific applications and limited surface types, there is a wide range of applications that potentially involve the need for bonding and delamination on multiple surface types in several configurations for which such adhesives may not work well. There exists a need, therefore, for adhesive systems that are more widely applicable and that compensate for deficiencies in individual adhesives.

SUMMARY OF THE INVENTION

The foregoing limitations of conventional adhesives are herein addressed by embodiments of adhesive systems that incorporate multiple adhesion structures. As utilized herein, the term "adhesion structure" includes many types of materials and/or structures that adhere to a surface, with or without applied power or vacuum. Adhesion structures include, but are not limited to, pressure-sensitive adhesives such as tapes, nanostructured dry adhesives such as "gecko adhesives," suction cups, claws that engage (i.e., adhere to, grip by friction, and/or slightly penetrate) a surface, electrostatic clamps, microspines, permanent magnets, and electromagnets. In general, a "solid adhesion structure" has a solid physical form and mechanical integrity, as distinguished, for example, from liquid and even highly viscous curable chemical adhesives, although it should be understood that a solid adhesion structure, such as a strip of tape, may include a chemical adhesive component.

In one embodiment, the adhesion structures in the system complement each other, compensating for their individual deficiencies. Moreover, the adhesion structures may be solid and may form reversible bonds to allow repositioning upon a variety of surfaces. In this manner, specialized applications such as improved wall-climbing apparatuses and grappling hooks are enabled.

In one aspect, embodiments of the invention feature an adhesive system that includes (i) a first solid adhesion structure that requires an applied normal preload force to achieve adhesion to a surface, and (ii) a second solid adhesion structure separate from but joined to the first adhesion structure. Both adhesion structures are jointly adherable to the surface upon application of the normal preload force. The second adhesion structure may be separately adherable to the surface without the normal preload force. The adhesion structures may be structurally complementary and/or functionally complementary such that, when the adhesive system is adhered to a surface, each adhesion structure overcomes an adhesion limitation exhibited by the other adhesion structure.

Embodiments of the invention may include one or more of the following. The first adhesion structure may be a pressure-sensitive adhesive, a nanostructured dry adhesive, a claw, or a microspine. The second adhesion structure may be a microspine, a suction cup, an electrostatic clamp, a permanent magnet, or an electromagnet. The first and second adhesion structures may be joined by a pivot. The adhesive system may include a human- and/or robot-manipulable interface for adhering the first and second adhesion structures to a surface. The adhesion structures may be connected to the end of a rope and/or disposed on a sheet. The adhesion structures may be non-curable and/or may be disposed proximate the concave surface of a suction cup. The adhesive system may additionally include one or more mechanical grippers such as claws. The first adhesion structure may include at least one microspine and the second adhesion structure may include a nanopatterned dry adhesive. The normal preload force may be supplied by the second solid adhesion structure to the first solid adhesion structure.

In another aspect, embodiments of the invention feature a method of adhering to a surface an adhesive system that includes first and second joined adhesion structures. At least one of the adhesion structures requires an applied normal preload force to achieve adhesion to the surface. The method includes applying the normal preload force to the adhesive system, whereby both adhesion structures are jointly adhered to the surface. The first adhesion structure may be a pressure-sensitive adhesive, a nanostructured dry adhesive, a claw, or a microspine. The second adhesion structure may be a microspine, a suction cup, an electrostatic clamp, a permanent magnet, or an electromagnet. The method may include disengaging the adhesive system from the surface and applying the normal preload force to the adhesive system to adhere it to the surface in another location. Applying the normal preload force to the adhesive system may include applying a force, approximately parallel to the surface, to a pivot connected to the first and second adhesion structures. The first and second adhesion structures may be non-curable. The first and second adhesion systems may be disposed proximate the concave surface of a suction cup, and applying the normal preload force may include affixing the suction cup to the surface. The second adhesion structure may apply the normal preload force to the first adhesion structure.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIGS. 1-6A are schematic side views of adhesion systems in accordance with various embodiments of the invention; and FIG. 6B is a schematic front view of the adhesion system illustrated in FIG. 6A.

DESCRIPTION

Figure 1:
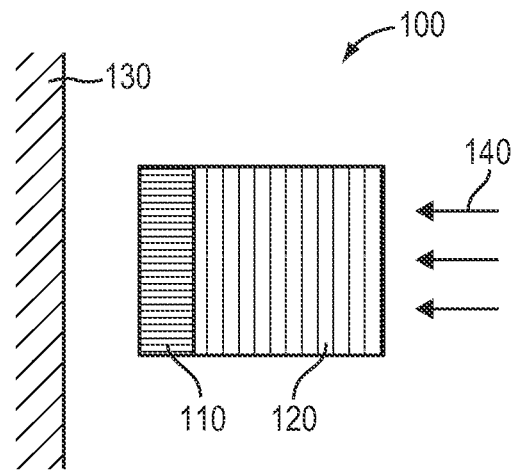

Referring to FIG. 1, an adhesive system 100 includes, in one embodiment, joined adhesion structures 110, 120 which adhere to surface 130 upon application of normal preload force 140. Normal preload force 140 may be applied externally or may be the result of attractive forces between at least one of adhesion structures 110, 120 and surface 130. Normal preload force 140 may also be a component approximately perpendicular to surface 130 of a force applied in a non-perpendicular direction. Normal preload force 140 may be physically (e.g., mechanically) applied to adhesion structures 110, 120, or may result from current or voltage applied to one or both of adhesion structures 110, 120. In one embodiment, surface 130 is substantially two-dimensional. Surface 130 may be dry or wet, and may be formed of any of a number of solid materials, e.g., glass, metal, plastic, concrete, etc. Adhesion structure 120 may adhere to surface 130 indirectly, via its attachment to adhesion structure 110, or may contact and adhere to surface 130 directly. In an embodiment, adhesion structures 110, 120 both contact and adhere to surface 130 in a "parallel" arrangement, in which adhesion structures 110, 120 are joined side-by-side or in a tiled arrangement (in which areas of adhesion structure 110 are surrounded by adhesion structure 120 and vice versa).

In various embodiments, adhesion structures 110, 120 are generally solid, man-made materials which are capable of forming a reversible bond with a variety of possible surfaces. Many types of structures are contemplated as suitable adhesion structures 110, 120, including, but not limited to:

Pressure-sensitive adhesives, e.g., adhesive tapes, that adhere to a variety of different surfaces but require a normal preload force to activate such adhesion. Once the adhesion is activated, the pressure-sensitive adhesive maintains adhesion to the surface even in the absence of further force.

Nanostructured dry adhesives, e.g., "gecko adhesives," that include a plurality of small tendrils, or spatulae, which exhibit van der Waals adhesion and/or a capillary interaction to a surface upon contact therewith and application of a normal preload force. Each tendril may be small, e.g., 100-500 nm in size, and may be formed of, e.g., a polymer material such as a polyimide, polyester, rubber, or keratin, or carbon nanotubes. The tendrils may be formed on a compliant film, e.g., of a polymer material, to optimize the contact of the tendrils with the surface. The nanostructured dry adhesive may be fabricated via an imprinting and molding process, in which a mold is formed by imprinting an array of nanoscale impressions of the desired tendril shape (e.g., pyramidal or cylindrical) into a compliant mold (formed of, e.g., wax). The impressions may be made with, e.g., an atomic force microscope tip, a scanning tunneling microscope probe tip, or a glass pipette. The polymer tendril material is then introduced into the mold and the mold is peeled away, leaving the desired array of tendrils. Advantageously, the nanostructured dry adhesives may be self-cleaning, i.e., exhibit optimal adhesion after many adhesion/deadhesion cycles.

Suction cups, which require applied vacuum (either periodically or continuously) to adhere to a surface. The vacuum may arise from an applied normal force which forces air from the cup when the rim thereof makes contact with the surface. As described above and in further detail below, embodiments of the invention include suction cups with other adhesive(s) joined to a concave surface thereof. In an embodiment, the other adhesive(s) are also formed between arrayed suction cups and contact surface 130 in parallel with the suction cups.

Permanent or electromagnets that are attracted to various types of surface 130, e.g., types including or consisting essentially of ferrous materials. The attractive magnetic force of electromagnets arises as a result of voltage applied thereto and diminishes at least partially in the absence of the applied voltage.

Electrostatic clamps resemble electromagnets but produce an electrostatic (rather than magnetic) force in response to an applied voltage. For example, an electrostatic clamp may include an interspersed array of electrodes across which a voltage is applied. Upon application of the voltage, electric field lines form between the electrodes and penetrate other nearby objects. An attractive (and adhesive) force results due to the fact that it is energetically favorable for the electric field lines to travel through a medium with a dielectric constant higher than that of air or vacuum. The adhesive force diminishes at least partially in the absence of the applied voltage. Surface 130 may be conducting or non-conducting. In an embodiment, surface 130 is conducting and a surface of the electrostatic clamp contacting surface 130 includes or consists essentially of a dielectric material.

Claws (e.g., grippers with one or more prongs extending outwardly from their ends), which may penetrate surface 130 upon the application of a normal preload force.

Microspines, which are similar in structure to claws but "catch" on asperities on surface 130 rather than penetrate it. Microspines require a normal preload force to adhere to a surface, and require at least one surface feature larger than approximately the diameter of the tips of the microspines to maintain adhesion. Microspines may be formed of a material such as stainless steel or a polymer. The microspines may have a length of approximately 1-10 mm, a diameter of approximately 100-500 µm, and a tip radius of approximately 1-50 µm.

Figure 2:
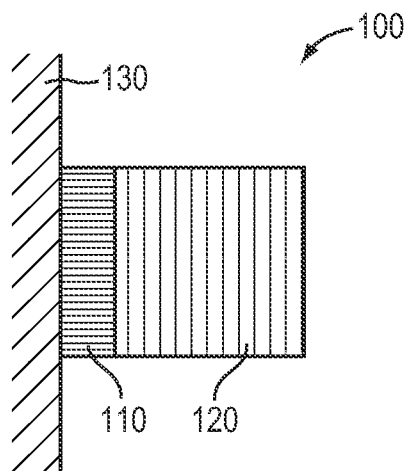

FIG. 2 illustrates the adhesive system 100 adhered to surface 130 after application of applied normal preload force 140. Adhesive system 100 may remain adhered to surface 130 even in the absence of continuous application of normal preload force 140. In one embodiment, adhesion structure 110 requires application of normal preload force 140 to adhere to surface 130, and adhesion structure 120 exhibits an attractive force with respect to surface 130. Thus, the attractive force between adhesion structure 120 and surface 130 acts as the normal preload force 140 required to adhere adhesion structure 110 to surface 130. For example, adhesion structure 110 may include or consist essentially of a pressure-sensitive adhesive or a nanostructured dry adhesive, and adhesion structure 120 may include or consist essentially of an electromagnet or permanent magnet. When adhesive system 100 is brought close to surface 130, the attractive force between adhesion structure 120 and surface 130 preloads (i.e., applies the necessary normal preload force 140 to) adhesion structure 110. In a similar embodiment, adhesion structure 120 includes or consists essentially of an electrostatic clamp or an electromagnet, and the attractive force between it and surface 130 (created by an applied voltage) preloads adhesion structure 110. Even after the applied voltage is removed, adhesive system 100 remains adhered to surface 130 because adhesion structure 110 was sufficiently preloaded.

In another embodiment, adhesion structure 120 includes or consists essentially of a suction cup, and adhesion structure 110 includes or consists essentially of a pressure-sensitive adhesive that is coated over at least a portion of the concave surface of adhesion structure 120. Vacuum is applied to adhesion structure 120 to adhere it to surface 130, thereby also providing the requisite normal preload force to adhere adhesion structure 110 to surface 130. Even in the absence of further vacuum to maintain the "seal" of adhesion structure 120, adhesion of adhesive system 100 is maintained at least by adhesion structure 110.

As described above, an advantage of adhesive system 100 is that its individual components, i.e., adhesion structures 110, 120, may be structurally complementary (i.e., easily joined together to form a unified manipulable whole) as well as functionally complementary. That is, when adhesive system 100 is adhered to surface 130, each of adhesion structures 110, 120 overcomes an adhesion limitation exhibited by the other. For example, adhesion structure 110 may exhibit better adhesion (in the shear or normal directions) than adhesion structure 120, but may require a normal preload force to achieve adhesion. Adhesion structure 120, on the other hand, may adhere simply due to attractive force but may require at least periodic application of voltage (e.g., for an electromagnet or electrostatic clamp) or vacuum (e.g., for a suction cup), or may exhibit poor shear adhesion (e.g., a magnet). When adhesion structures 110, 120 are combined, each compensates for the limitations of the other, and adhesive system 100 exhibits superior adhesive properties over a wide range of surfaces 130.

Figure 3:
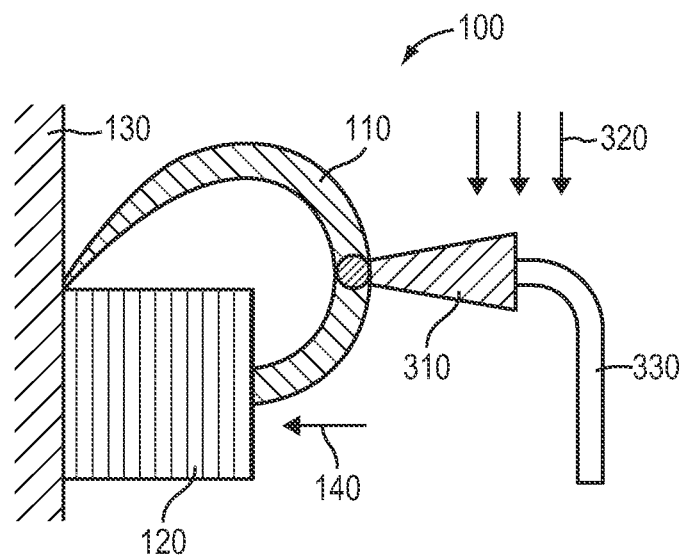

Referring to FIG. 3, in one embodiment, adhesive system 100 includes adhesion structures 110, 120, a pivot 310, and a rope 330. Adhesion structure 110 may require little or no normal preload force and may exhibit good shear adhesion, i.e., resistance to force in a direction approximately parallel to surface 130. For example, adhesion structure 110 may include or consists essentially of at least one microspine, which catches on a feature of surface 130. For its part, adhesion structure 120 may require a normal preload force to achieve adhesion, and may be connected to adhesion structure 110 through pivot structure 310. Adhesion structure 120 may include or consist essentially of a nanostructured dry adhesive. In one embodiment, when adhesive system 100 is brought into contact with surface 130, adhesion structure 110 engages surface 130, and normal preload force 140 is applied to adhesion structure 120 through pivot structure 310 upon application of further force 320 substantially parallel to surface 130. Pivot structure 310 may thus support a load exerting force approximately parallel to surface 130, and may be connected to optional rope 330 for such a purpose.

Figure 4:
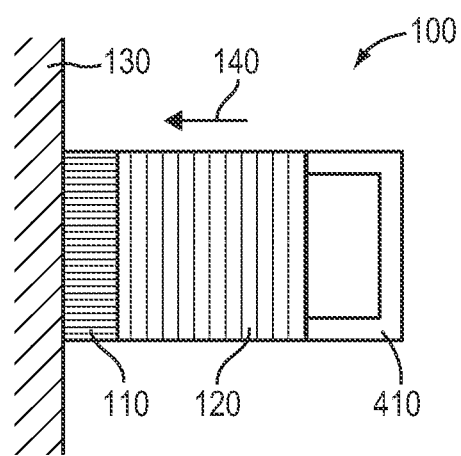

Referring to FIG. 4, adhesive system 100 may also include a human- or robot-manipulable interface 410 for applying the requisite normal preload force 140 to initiate and/or maintain adhesion to surface 130. Interface 410 may be sized and shaped to accommodate a human hand or foot, or at least one "limb" or protrusion from a robot or other machine. In this manner, adhesive system 100 may be utilized to facilitate the scaling of walls or other surfaces by a human or autonomous (or semi-autonomous) robot. In such application, the adhesion of adhesive system 100 to surface 130 may be reversible, i.e., adhesive system 100 may be disengaged from surface 130 by the application of a shear force or a normal force directed away from surface 130. Afterward, adhesive system 100 may be repositioned proximate another location on surface 130 and adhered thereto.

Figure 5:
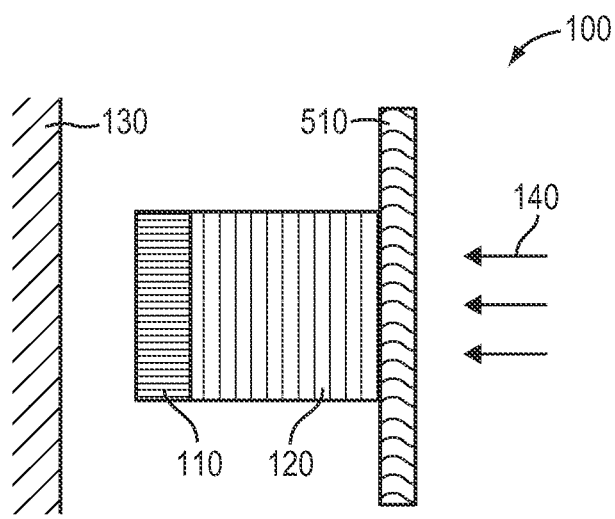

FIG. 5 illustrates yet another embodiment of the invention. As illustrated, adhesive system 100, including adhesion structures 110, 120, may be disposed on at least a portion of at least one side of a sheet 510 to facilitate the positionable attachment of sheet 510 to surface 130. As described above, normal preload force 140 enables the adhesion of adhesion structures 110, 120 to surface 130. In a further embodiment, adhesive system 100 covers substantially all of one side of sheet 510. Sheet 510 may include or consist essentially of a thin material such as paper or cloth. Sheet 510 may be, for example, a poster.

Figures 6A, 6B:
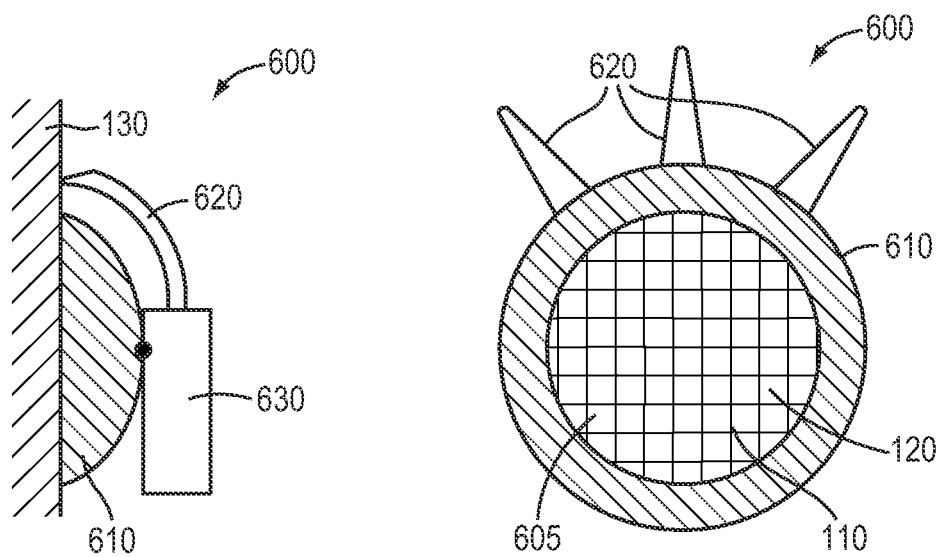

Referring to FIGS. 6A and 6B, an adhesive system 600 includes, in another embodiment, a suction cup 610, at least one claw 620, and an interface 630. Adhesive system 600 may also incorporate one or more of the various adhesive systems 100 described above, or select components thereof. For example, one or more of the various adhesive systems 100, or their components, may be coupled or applied to the concave surface 605 of suction cup 610. In one embodiment, the adhesion structures 110, 120 described above in reference to FIG. 3 are coupled to the concave surface 605. More specifically, adhesion structure 110 may include or consist essentially of at least one microspine, and adhesion structure 120 may include or consist essentially of a nanostructured dry adhesive. For example, adhesion structures 110, 120 may be "tiled" over substantially all of the concave surface 605 of suction cup 610, and may be activated (i.e., adhered to surface 130) via a normal preload force applied thereto when suction cup 610 is affixed to surface 130. In an embodiment, even if the normal preload force applied to suction cup 610 is insufficient to adhere suction cup 610 to surface 130 (and/or surface 130 is not amenable, e.g., too rough, to suction cup adhesion), the normal preload force is sufficient to adhere adhesion structures 110, 120 to surface 130. In another embodiment, the adhesion of suction cup 610 to surface 130 preloads only one of adhesion structures 110, 120, e.g., in the case when surface 130 is adhered to only by one or the other.

With reference still to FIGS. 6A and 6B, adhesive system 600 may include at least one claw 620 (e.g., a member with one or more prongs extending outwardly from its end) that adheres to or engages surface 130 together with suction cup 610. As illustrated, suction cup 610 and claw 620 may be connected by interface 630, which may be human- and/or robot-manipulable like interface 410 described above. The adhesion of claw 620 onto surface 130 may also supply the requisite normal preload force to adhere suction cup 610, adhesion structure 110, and/or adhesion structure 120 to surface 130. For example, in an embodiment, claw 620 contacts and/or penetrates surface 130 in response to a force normal thereto, and adhesive system 600 pivots toward surface 130 from the point of contact until suction cup 610 contacts surface 130 and is preloaded. Adhesive system 600 is thus suitable for adhesion to many types of surface 130.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. An adhesive system, comprising:
a first non-curable solid adhesion structure that requires an applied preload force orthogonal to a surface to achieve adhesion to the surface; and
a second non-curable solid adhesion structure for applying the preload force to the first adhesion structure, the second adhesion structure being separate from but joined to the first adhesion structure such that both adhesion structures are jointly adherable to the surface upon application of the preload force, the first and second adhesion structures being structurally different from one another and functionally complementary to one another such that, when the adhesive system is adhered to the surface, each of the adhesion structures overcomes an adhesion limitation exhibited by the other adhesion structure, the second adhesion structure requiring at least a periodic application of energy, force, or vacuum in order to adhere to the surface.

2. The adhesive system of claim 1, wherein the first and second adhesion structures are structurally complementary.

3. The adhesive system of claim 1, wherein the first adhesion structure is selected from the group consisting of a pressure-sensitive adhesive, a nanostructured dry adhesive, a claw, and a microspine.

4. The adhesive system of claim 1, wherein the second adhesion structure is selected from the group consisting of a suction cup, an electrostatic clamp, and an electromagnet.

5. The adhesive system of claim 1, further comprising a pivot joining the first and second adhesion structures.

6. The adhesive system of claim 1, further comprising a human-manipulable interface for adhering the first and second adhesion structures to the surface.

7. The adhesive system of claim 1, further comprising a robot-manipulable interface for adhering the first and second adhesion structures to the surface.

8. The adhesive system of claim 1, wherein the first and second adhesion structures are connected to an end of a rope.

9. The adhesive system of claim 1, wherein the first and second adhesion structures are disposed on a sheet.

10. The adhesive system of claim 1, wherein both the first and second adhesion structures are disposed proximate a concave surface of a suction cup.

11. The adhesive system of claim 10, further comprising at least one claw coupled to the suction cup.

12. The adhesive system of claim 10, wherein the first adhesion structure comprises a nanostructured dry adhesive and the second adhesion structure comprises at least one microspine.

* * * * *